(12) United States Patent
Kovarsky et al.

(10) Patent No.: US 7,273,535 B2
(45) Date of Patent: *Sep. 25, 2007

(54) INSOLUBLE ANODE WITH AN AUXILIARY ELECTRODE

(75) Inventors: Nicolay Y. Kovarsky, Sunnyvale, CA (US); Dmitry Lubomirsky, Cupertino, CA (US); Yevgeniy (Eugene) Rabinovich, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 10/664,277

(22) Filed: Sep. 17, 2003

(65) Prior Publication Data

US 2005/0056538 A1    Mar. 17, 2005

(51) Int. Cl.
*C25D 5/00*    (2006.01)
*C25D 17/00*   (2006.01)
*C25B 9/00*    (2006.01)

(52) U.S. Cl. .................. 204/260; 204/252; 204/272; 205/87

(58) Field of Classification Search .......... 205/87; 204/260, 252, 272
See application file for complete search history.

(56) References Cited

U.S. PATENT DOCUMENTS

| | | |
|---|---|---|
| 3,054,734 A | 9/1962 | Harrover |
| 4,287,029 A | 9/1981 | Shimamura |
| 4,304,641 A | 12/1981 | Grandia et al. |
| 4,466,864 A * | 8/1984 | Bacon et al. ............... 205/105 |
| 4,786,390 A * | 11/1988 | Lichtenberger et al. ..... 204/242 |
| 4,933,051 A | 6/1990 | Kline |
| 5,162,079 A | 11/1992 | Brown |
| 5,222,310 A | 6/1993 | Thompson et al. |
| 5,377,708 A | 1/1995 | Bergman et al. |
| 5,421,987 A | 6/1995 | Tzanavaras et al. |
| 5,443,707 A | 8/1995 | Mori |
| 5,489,341 A | 2/1996 | Bergman et al. |
| 5,516,412 A | 5/1996 | Andricacos et al. |
| 5,584,310 A | 12/1996 | Bergman et al. |
| 5,620,581 A | 4/1997 | Ang |
| 5,670,034 A | 9/1997 | Lowery |
| 5,678,320 A | 10/1997 | Thompson et al. |

(Continued)

FOREIGN PATENT DOCUMENTS

EP    0 307 161 A    3/1989

(Continued)

OTHER PUBLICATIONS

PCT International Search Report from International Application No. PCT/US 2004/030445, dated Jan. 13, 2005.

*Primary Examiner*—Roy King
*Assistant Examiner*—Nicholas A. Smith
(74) *Attorney, Agent, or Firm*—Patterson & Sheridan, LLP

(57) ABSTRACT

A method and apparatus for plating a metal onto a substrate. The apparatus includes a fluid basin configured to contain a plating solution, an anode fluid volume positioned in a lower portion of the fluid basin, a cathode fluid volume positioned in an upper portion of the fluid basin, an ionic membrane positioned to separate the anode fluid volume from the cathode fluid volume, a plating electrode centrally positioned in the anode fluid volume, and a deplating electrode positioned adjacent the plating electrode in the anode fluid volume.

15 Claims, 6 Drawing Sheets

U.S. PATENT DOCUMENTS

| | | |
|---|---|---|
| 5,744,019 A | 4/1998 | Ang |
| 6,004,440 A | 12/1999 | Hanson et al. |
| 6,080,289 A | 6/2000 | Palmatier et al. |
| 6,132,857 A | 10/2000 | Champenois et al. |
| 6,143,155 A | 11/2000 | Adams et al. |
| 6,197,181 B1 | 3/2001 | Chen |
| 6,221,230 B1 | 4/2001 | Takeuchi et al. |
| 6,228,231 B1 | 5/2001 | Uzoh |
| 6,248,222 B1 * | 6/2001 | Wang .................... 204/297.09 |
| 6,261,433 B1 | 7/2001 | Landau |
| 6,270,647 B1 | 8/2001 | Graham et al. |
| 6,277,263 B1 | 8/2001 | Chen |
| 6,322,674 B1 | 11/2001 | Berner et al. |
| 6,383,352 B1 | 5/2002 | Shyu et al. |
| 6,391,166 B1 | 5/2002 | Wang |
| 6,395,152 B1 | 5/2002 | Wang |
| 6,440,295 B1 | 8/2002 | Wang |
| 6,497,801 B1 * | 12/2002 | Woodruff et al. ........ 204/230.2 |
| 6,562,204 B1 | 5/2003 | Mayer et al. |
| 6,565,729 B2 | 5/2003 | Chen et al. |
| 6,569,297 B2 | 5/2003 | Wilson et al. |
| 6,773,571 B1 * | 8/2004 | Mayer et al. .................. 205/96 |
| 6,916,412 B2 * | 7/2005 | Woodruff et al. ............. 205/97 |
| 2002/0029973 A1 | 3/2002 | Mayden |
| 2003/0062258 A1 | 4/2003 | Woodruff et al. |
| 2003/0079995 A1 | 5/2003 | Contolini et al. |
| 2003/0102210 A1 | 6/2003 | Woodruff et al. |
| 2004/0016636 A1 * | 1/2004 | Yang et al. .................. 204/237 |
| 2004/0016637 A1 | 1/2004 | Yang et al. |
| 2004/0016647 A1 * | 1/2004 | Yang et al. .................. 205/123 |
| 2004/0134775 A1 * | 7/2004 | Yang et al. .................. 204/296 |
| 2004/0217005 A1 | 11/2004 | Rosenfeld et al. |

FOREIGN PATENT DOCUMENTS

| | | |
|---|---|---|
| EP | 1 170 402 A | 1/2002 |

* cited by examiner

INSOLUBLE ANODE WITH AN AUXILIARY ELECTRODE

BACKGROUND OF THE INVENTION

1. Field of the Invention

Embodiments of the invention generally relate to a plating cell having a deplating electrode positioned radially outward of a plating electrode.

2. Description of the Related Art

Metallization of sub-quarter micron sized features is a foundational technology for present and future generations of integrated circuit manufacturing processes. More particularly, in devices such as ultra large scale integration-type devices, i.e., devices having integrated circuits with more than a million logic gates, the multilevel interconnects that lie at the heart of these devices are generally formed by filling high aspect ratio, i.e., greater than about 4:1, interconnect features with a conductive material, such as copper or aluminum. Conventionally, deposition techniques such as chemical vapor deposition (CVD) and physical vapor deposition (PVD) have been used to fill these interconnect features. However, as the interconnect sizes decrease and aspect ratios increase, void-free interconnect feature fill via conventional metallization techniques becomes increasingly difficult. Therefore, plating techniques, i.e., electrochemical plating (ECP) and electroless plating, have emerged as promising processes for void free filling of such features.

In an ECP process, for example, sub-quarter micron sized high aspect ratio features formed into the surface of a substrate (or a layer deposited thereon) may be efficiently filled with a conductive material, such as copper. ECP plating processes are generally two stage processes, wherein a seed layer is first formed over the surface features of the substrate, and then the surface features of the substrate are exposed to an electrolyte solution, while an electrical bias is applied between the seed layer and a copper anode positioned within the electrolyte solution. The electrolyte solution generally contains ions to be plated onto the surface of the substrate, and therefore, the application of the electrical bias causes these ions to be urged out of the electrolyte solution and to be plated onto the biased seed layer.

Conventional electrochemical plating cells generally utilize soluble anodes, e.g., a copper anode in a copper plating system. Soluble anodes generally operate as both an anodic electrode, as well as a source of replenishment for the copper ions. However, the use of soluble anodes presents several challenges. For example, additives in the plating solution, i.e., levelers, suppressors, accelerators, etc., are known to react or break down when they contact the anode. Additionally, soluble anodes are prone to developing layers of material on the surface thereof during plating operations, which has a detrimental effect upon plating uniformity. Further, conventional plating cells also face challenges related to copper from the plating solution plating onto the electrical contacts (cathode electrodes) that are used to electrically contact the substrate during plating operations. When the copper plates on these contacts, the electrical resistance and/or the shape of the contacts may be changed, which also has a negative effect upon plating uniformity.

Therefore, there is a need for a plating cell configured to minimize additive breakdown at the anode via use of an insoluble anode, while also providing for a way to remove the copper that accumulates on the substrate contact pins.

SUMMARY OF THE INVENTION

Embodiments of the invention provide an electrochemical plating cell. The plating cell includes a fluid basin having an anolyte solution compartment and a catholyte solution compartment, an ionic membrane positioned between the anolyte solution compartment and the catholyte solution compartment, and an anode positioned in the anolyte solution compartment, wherein the ionic membrane comprises a poly tetrafluoroethylene based ionomer. The plating cell further includes a deplating electrode positioned radially outward of the anode electrode in the anolyte solution compartment.

Embodiments of the invention may further provide an apparatus for plating a metal onto a substrate. The apparatus includes a fluid basin configured to contain a plating solution, an anode fluid volume positioned in a lower portion of the fluid basin, a cathode fluid volume positioned in an upper portion of the fluid basin, an ionic membrane positioned to separate the anode fluid volume from the cathode fluid volume, a plating electrode centrally positioned in the anode fluid volume, and a deplating electrode positioned adjacent the plating electrode in the anode fluid volume.

Embodiments of the invention may further provide an electrochemical plating cell. The plating cell includes an anolyte compartment, a catholyte compartment positioned in ionic communication with the anolyte compartment via an ionic membrane, an anode positioned in the anolyte compartment, a deplating electrode positioned in the anolyte compartment, and a power supply in electrical communication with the anode and the deplating electrode.

Embodiments of the invention may further provide a method for plating metal onto a substrate. The method includes positioning a substrate in a plating cell having an anolyte compartment, a catholyte compartment, and an ionic membrane separating the anolyte compartment from the catholyte compartment, supplying a first plating bias to an anode positioned in the anolyte compartment to plate the metal onto the substrate, and supplying a deplating bias to a deplating electrode positioned in the anolyte compartment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally provides an electrochemical plating cell configured to plate metal onto semiconductor substrates using a small volume cell, i.e., the volume of the cell contains less than about 4 liters of electrolyte in the cell itself, preferably between about 1 and 3 liters, and potentially between about 2 and about 8 liters of electrolyte solution in an adjacent fluidly connected supply tank (for a cell configured to plate 300 mm substrates). These small volumes of fluid required to operate the cell of the invention allow the electroplating cell to be used for a predetermined number of substrates, i.e., 100-200, after which the solution may be discarded and replaced with new solution. The electrochemical plating cell is generally configured to fluidly isolate an anode of the plating cell from a cathode or plating electrode of the plating cell via a cation membrane positioned between the substrate being plated and the anode of the plating cell. Additionally, the plating cell of the invention is generally configured to provide a first fluid solution to an anode compartment, i.e., the volume between the upper surface of the anode and the lower surface of the membrane, and a second fluid solution (a plating solution that is generally different from the first solution) to the cathode compartment, i.e., the volume of fluid positioned above the upper membrane surface. The anode of the plating cell generally includes a plurality of slots formed therein, the plurality of slots being positioned parallel to each other and are configured to remove a concentrated hydrodynamic Newtonian fluid layer from the anode chamber surface during plating processes. A membrane support having a plurality of slots or channels formed in a first side of the assembly, along with a plurality of bores formed into a second side of the membrane support, wherein the plurality of bores are in fluid communication with the slots on the opposing side of the membrane support, is used to support an ionic membrane that operates to fluidly separate the anode compartment-from the cathode compartment. Further still, the plating cell of the invention includes a deplating electrode positioned in the anode compartment. The deplating electrode is generally configured to be used as a cathode (when the substrate contacts are configured as anodes) for deplating the copper that accumulates on the substrate contacts.

Figure 1:
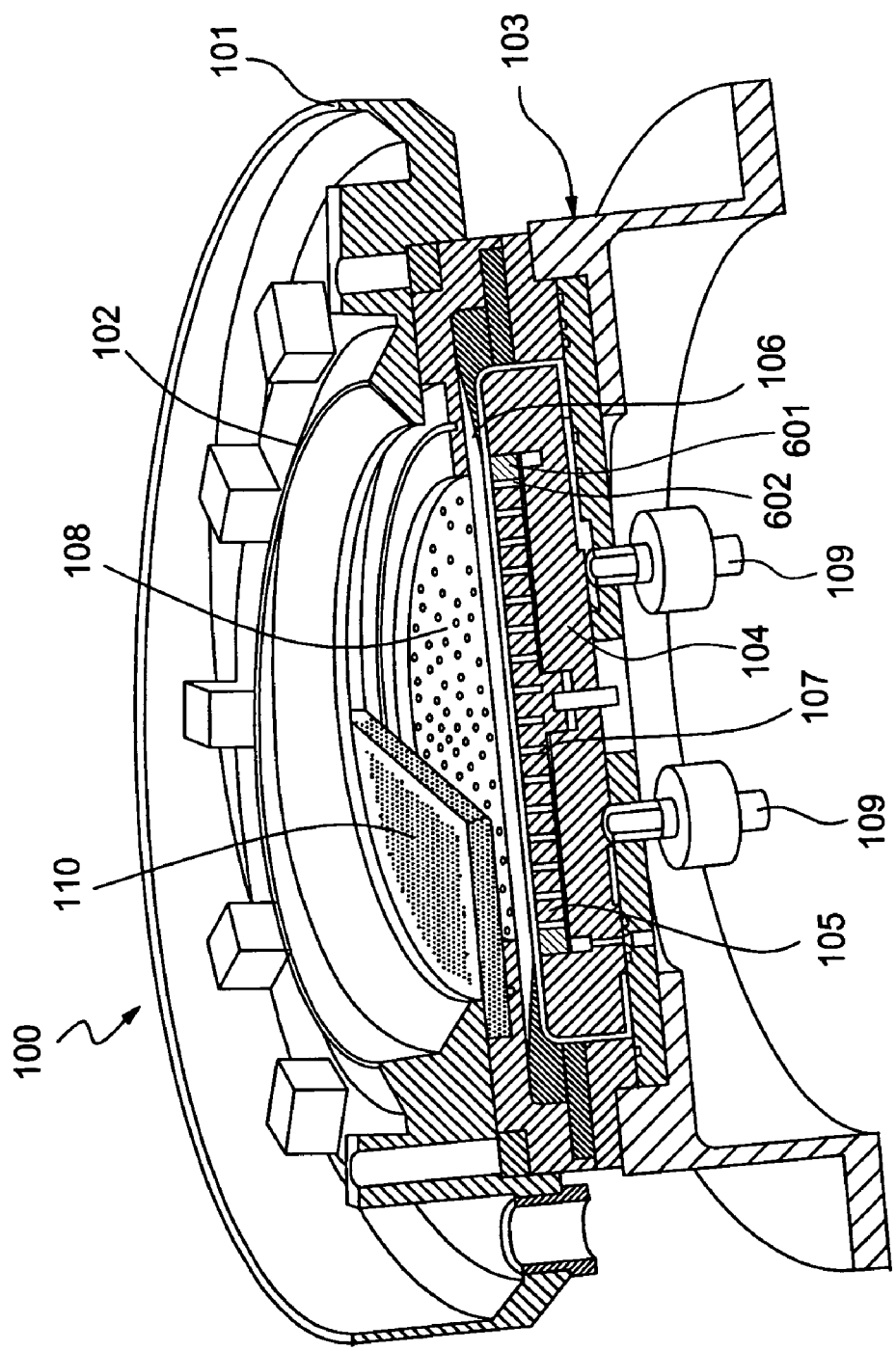
FIG. 1 illustrates a partial sectional perspective view of an exemplary electrochemical plating slim cell of the invention.

FIG. 1 illustrates a perspective and partial sectional view of an exemplary electrochemical plating cell 100 of the invention. Plating cell 100 generally includes an outer basin 101 and an inner basin 102 positioned within outer basin 101. Inner basin 102 is generally configured to contain a plating solution that is used to plate a metal, e.g., copper, onto a substrate during an electrochemical plating process. During the plating process, the plating solution is generally continuously supplied to inner basin 102 (at about 1 gallon per minute for a plating cell having a 10 liter total capacity (capacity generally includes the cell volume and the supply tank), for example), and therefore, the plating solution continually overflows the uppermost point of inner basin 102 (weir 103) and runs into outer basin 101. The overflow plating solution is then collected by outer basin 101 and drained therefrom for recirculation into basin 102. As illustrated in FIG. 1, plating cell 100 is generally positioned at a tilt angle, i.e., the frame portion 103 of plating cell 100 is generally elevated on one side such that the components of plating cell 100 are tilted between about 3° and about 30°. Therefore, in order to contain an adequate depth of plating solution within inner basin 102 during plating operations, the uppermost portion of basin 102 may be extended upward on one side of plating cell 100, such that the uppermost point of inner basin 102 is generally horizontal and allows for contiguous overflow of the plating solution supplied thereto around the perimeter of basin 102.

Figure 2:
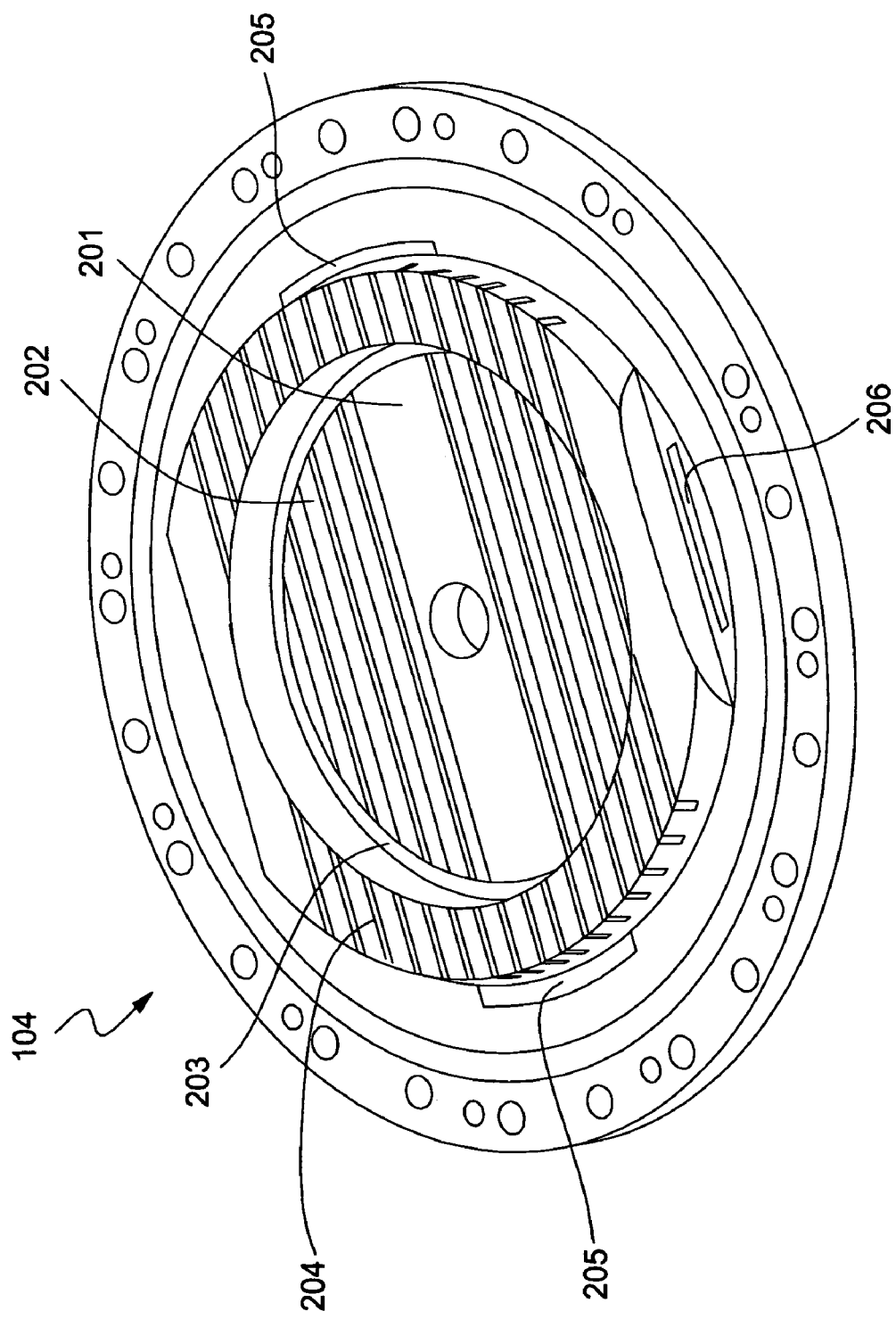
FIG. 2 illustrates a perspective view of an anode base plate of the invention.

FIG. 2 illustrates a perspective view of the anode base member 104 without an anode 105 or deplating electrode 601 positioned therein. The upper surface of base member 104 generally includes an annular recessed portion 201 configured to receive a disk shaped anode 105 (and optionally a deplating electrode, which will be further discussed herein) therein. Further, the bottom surface of annular recessed portion 201 generally includes a plurality of anode base channels 202 formed therein. Each of anode base channels 202 are generally positioned in parallel orientation with each other, extend across the lower portion of the recessed portion 201, and terminate at the periphery of recessed region 201. Additionally, the periphery of recessed region 201 includes an annular drain channel 203 that extends around the perimeter of recessed portion 201. Each of the plurality of parallel positioned anode base channels 202 terminate at opposing ends into annular drain channel 203. Therefore, anode base channels 202 may receive dense fluids from anode channels 107 (further discussed herein) and transmit the dense fluids to drain channel 203 via anode base channels 202. The vertical wall that partially defines recessed portion 201 generally includes a plurality of anode base slots 204 formed into the wall. The anode base slots 204 are generally positioned in parallel orientation with each other, and further, are generally positioned in parallel orientation with the plurality of anode base channels 202 formed into the lower surface of recessed portion 201. Base member 104 also includes at least one fluid supply conduit 205 configured to dispense a fluid into the anode region of plating cell 100, along with at least one plating solution supply conduit 206 that is configured to dispense a plating solution into the cathode compartment of plating cell 100. The respective supply conduits 205 and 206 are generally in fluid communication with at least one fluid supply inlet/drain 109 (illustrated in FIGS. 1 and 2) positioned on a lower surface of base member 104.

Figure 3:
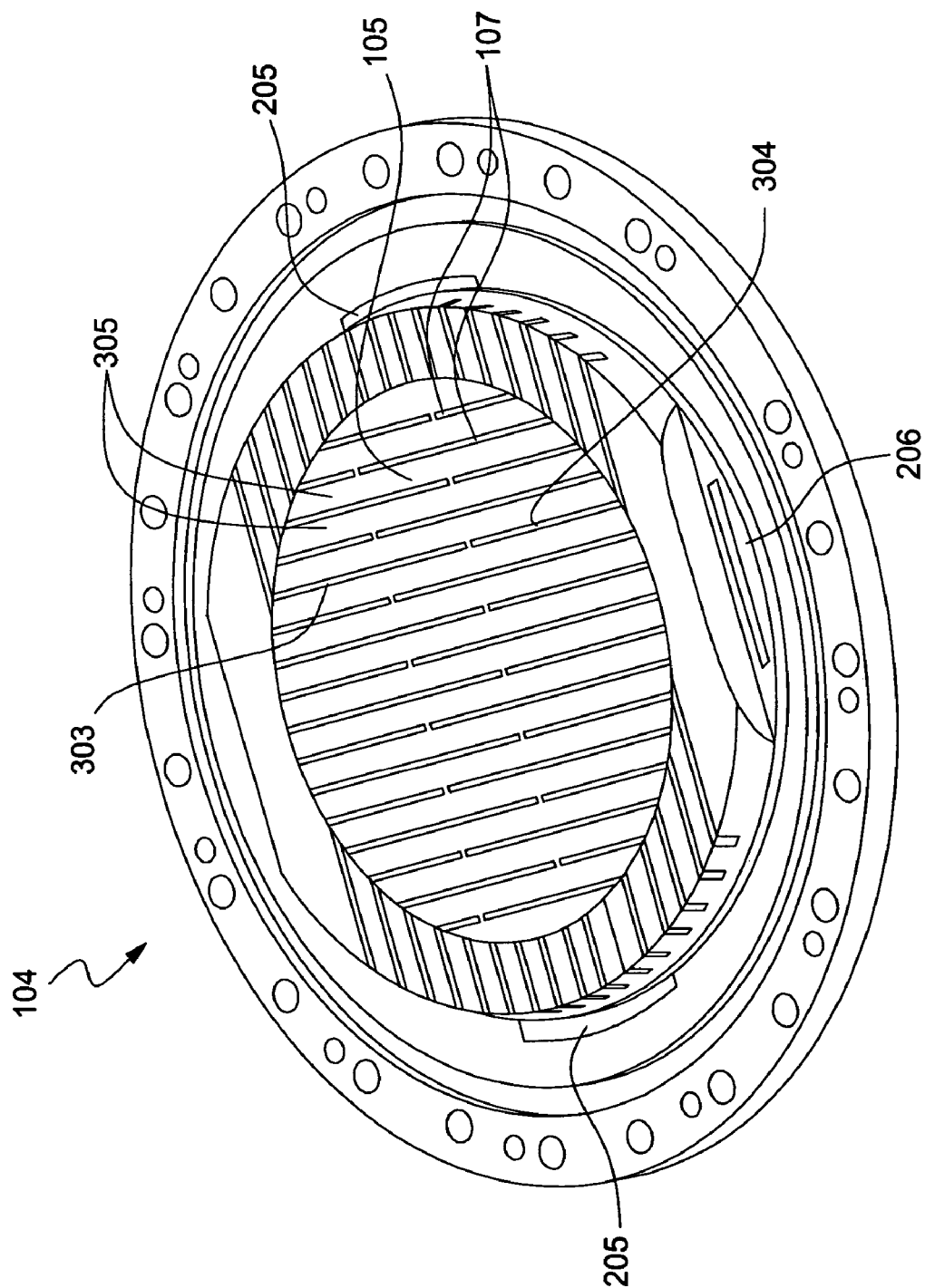
FIG. 3 illustrates a perspective view of an exemplary anode base plate of the invention having an anode positioned therein.

FIG. 3 illustrates a perspective view of base member 104 having the disk shaped anode 105 positioned therein without a deplating electrode 601. Anode 105, which is generally a disk shaped copper member, i.e., a soluble-type copper anode generally used to support copper electrochemical plating operations, generally includes a plurality of parallel positioned anode slots 107 formed therein. The anode slots 107 generally extend through the interior of anode 105 and are in fluid communication with both the upper surface and lower surface of anode 105, as illustrated in the cross section of anode 105 in FIG. 1. As such, anode slots 107 allow fluids to travel through the interior of anode 105 from the upper surface to the lower surface of the anode 105. However, when anode 105 is positioned within annular recess 201 of base member 104, the parallel anode slots 107 of anode 105 are generally positioned orthogonal to both anode base slots 204 and anode base channels 202 of base member 104, as illustrated cooperatively by FIGS. 2 and 3. Further, with regard to positioning, the anode slots 107 are generally positioned such that the tilt angle of the cell positions the slots orthogonal to fluid flow as a result of the tilt, i.e., the anode slots 107 are positioned such that fluid flowing across the surface of the anode 105 as a result of the tilt angle of the cell will intersect the anode slots 107 and be received therein. Although the inventors have illustrated the anode slots 107 being positioned orthogonally to the fluid flow, other fluid intersection angles, such as angles between about 5° and about 89°, are contemplated within the scope of the invention. Additionally, anode slots 107 generally do not continuously extend across the upper surface of anode 105. Rather, anode slots 107 are broken into a longer segment 303 and a shorter segment 304, with a conductive space 305 between the two segments, which operates to generate a longer current path through anode 105 from one side to the other (when the current path is measured orthogonal to the anode slots 107). Further, adjacently positioned anode slots 107 have the conductive spacer 305 positioned on opposite sides of the anode upper surface for each alternating anode slot 107. As such, the current path from the lower side of anode to the upper side of anode (orthogonal to the direction of the anode slots 107) generally includes a back and forth type path between the respective channels 107 through the spacer 305. Further, the positioning of spacers 305 and channels 107 provides for improved concentrated Newtonian fluid removal from the surface of the anode 105, as the positioning of channels 107 provides a shortest possible distance of travel for the dense fluids to be received in channels 107. This feature is important, as dense fluids generally travel slowly, and therefore, it is desirable.

Plating cell 100 further includes a membrane support assembly 106 configured to support the membrane 108. Membrane support assembly 106 is generally secured at an outer periphery thereof to base member 104, and includes an interior region that is configured to allow fluids to pass therethrough via a sequence of oppositely positioned slots, bores, or other fluid apertures (not shown). The membrane support assembly 106 may include an o-ring type seal (not shown) positioned near a perimeter of the membrane, wherein the seal is configured to prevent fluids from traveling from one side of the membrane 108 secured on the membrane support 106 to the other side of the membrane 108 without passing through the membrane itself.

The membrane 108 generally operates to fluidly isolate the anode chamber from the cathode chamber of the plating cell, and as such, membrane 108 is generally an ionic or ion exchange-type membrane. Ion exchange membranes generally include fixed negatively charged groups, such as $SO_3^-$, $COO^-$, $HPO_2^-$, $SeO_3^-$, $PO_3^{2-}$, or other negatively charged groups amenable to plating processes. As such, membrane 108 is configured to allow a particular type of ion to travel through the membrane, while preventing other types of ions from traveling or passing through the membrane. More particularly, membrane 108 may be a cationic membrane that is configured to allow positively charged copper ions ($Cu^{2+}$ and $H^+$) to pass therethrough, i.e., to allow copper ions to travel from the anode in the anolyte solution through the membrane 108 into the catholyte solution, where the copper ions may then be plated onto the substrate. Further, the cationic membrane may be configured to prevent passage of negatively charged ions and electrically neutral species in the solution, such as the ions that make up the plating solution and catholyte additives. It is desirable to prevent these catholyte additives from traveling through the membrane 108 and contacting the anode, as the additives are known to break down upon contacting the anode. More particularly, membranes with negatively charged ion groups like $SO_3^-$ etc. not only operate to facilitate Cu ion transport from the anolyte to the catolyte, but also to prevent penetration of accelerators to the anode. The accelerators are generally negatively charged organic ions: $^-SO_3^-$—$C_3H_6$—S—S—$C_3H_6^-SO_3^-$, so they can't penetrate into or through the cation membrane and contact the anode where they are consumed and/or depleted. This is important, as consumption of accelerators on copper anodes in conventional plating apparatuses without the ionic membrane is very high.

Membrane 108, for example, may be a Nafion®-type membrane manufactured by Dupont Corporation. Nafion® is an example of a poly (tetrafluoroethylene) based ionomer. Nafion® has several desirable characteristics for electrochemical plating applications, such as its thermal and chemical resistance, ion-exchange properties, selectivity, mechanical strength, and insolubility in water. Nafion® is also a cationic membrane based on a fluorized polymer matrix. Because of its fluorized matrix, Nafion® exhibits excellent chemical stability, even in concentrated basic solutions. More particularly, Nafion® is a perfluorinated polymer that contains small proportions of sulfonic or carboxylic ionic functional groups, and has been shown to be effective in transmitting metal ions (copper ions in the present embodiment) therethrough, even at low plating current densities. Specifically, Nafion® membranes have shown to be effective at transmitting between about 94% and about 98% of copper ions therethrough at plating current densities of between about 5 mA/cm² and about 20 mA/cm². Additionally, at current densities of between about 20 mA/cm² and about 60 mA/cm², Nafion® transmits between about 97% and about 93% of copper ions therethrough. The above noted transmission percentages were observed using a copper sulfate solution having a ph of about 3.4. Nafion's® general chemical structure (illustrated below as Diagram 1), illustrates where X is either a sulfonic or carboxylic functional group and M is either a metal cation in the neutralized form or an H+ in the acid form.

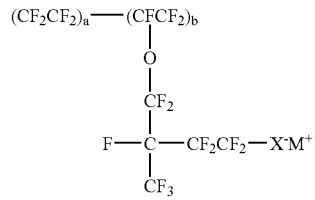

Diagram 1

As a result of electrostatic interactions, the ionic groups that form Nafion® tend to aggregate to form tightly packed regions referred to as clusters. The presence of these electrostatic interactions between the ions and the ion pairs enhance the intermolecular forces and thereby exert a significant effect on the properties of the parent polymer, which makes Nafion®, or other membranes having similar physical and/or operational characteristics, a desirable ionic membrane for use in electrochemical plating cells having separated anolyte and catholyte chambers.

As a result of electrostatic interactions, the ionic groups that form Nafion® tend to aggregate to form tightly packed regions referred to as clusters. The presence of these electrostatic interactions between the ions and the ion pairs enhance the intermolecular forces and thereby exert a significant effect on the properties of the parent polymer, which makes Nafion®, or other membranes having similar physical and/or operational characteristics, a desirable ionic membrane for use in electrochemical plating cells having separated anolyte and catholyte chambers.

Other membranes that may be used in embodiments of the invention include various cationic and anionic membranes. For example, ionic membranes manufactured by Tokuyama of Japan, i.e., CMX-SB ionic membranes that are based on a polydivinilbenzol matrix, may be used to isolate a catholyte solution from an anolyte solution in an electrochemical plating cell. CMX-SB membranes have been shown to be effective in transmitting copper ions while preventing organic plating additives from transmitting therethrough. Additionally, CMX-SB membranes have shown acceptable resistance to transmission of positive hydrogen ions. More particularly, CMX membranes have been shown to transmit above about 92% of copper ions at a current density of about 10 mA/cm$^2$, and above about 98% at a current density of about 60 mA/cm$^2$. Ionics CR-type membranes from Ionics Inc. have also shown to be able to transmit above about 92% of copper ions at about 10 mA/cm$^2$ and above about 88% of copper ions at about 60 mA/cm$^2$.

With regard to other properties of the above noted membranes (Ionics, CMX, and Nafion®), each exhibit relatively high conductivity, i.e., about 41.2, 35.3, and 24.2 ohm cm$^2$ at 10 mA/cm$^2$ for Ionics, Neosepta and Nafion®, respectively. Additionally, water moves through the membranes from the anolyte into the catholyte compartment. This effect essentially dilutes the catolyte and is undesirable. For example, between about 0.5 and about 3 liters of water penetrates into the catholyte per 24 hours (or per 200 wafers) depending on the membrane type and electrolysis conditions. For example, CMX shows the minimal water transport at about 1.5 ml/wafer, the Ionics membrane shows about 5 ml/wafer, and Nafion® shows about 6.5 ml/wafer. The transport properties of the CMX and Nafion® membranes result in the CuSO$_4$/H$_2$SO$_4$ concentration ratio remaining relatively constant, even after about 200 substrates are plated. This indicates that copper acid concentration changes will be lower than 2%, if the penetrated water will be removed, e.g., by enforced evaporation. As such, the use of CMX or Nafion® requires only a small device to accelerate the water evaporation to 4-6 liters/day. However, ionics membranes require an additional device that extracts the excess of H$_2$SO$_4$ coming from the anolyte. Table 1 illustrates the respective properties of the above noted membranes

TABLE 1

| Membrane | Cu$^{2+}$ transfer, % | Water transfer, ml/Amphr | Resistance ohm cm2 | Cu/Acid Ratio Deviation, % |
|---|---|---|---|---|
| Ionics | 90-95 | 8-11.5 | 53 | 4% |
| Nafion | 95-98 | 4-7.5 | 36 | 2% |
| CMX | 97-98 | 5.0-3.1 | 47 | 1% |

Vicor membranes may also be used to advantage in the plating cell of the invention. Other membranes that may be used in the plating cell of the invention include Neosepta® membranes (ionic and non-ionic) manufactured by Tokuyama, Aciplex® membranes, Selemlon® membranes, and Flemion membranes (all of which are available as ionic and non-ionic) from Asahi Corporation, Raipare™ membranes from Pall Gellman Sciences Corporation, and C-class membranes from Solvay Corporation.

The implementation of the membrane between the anode and the substrate being plated generates substantially different behaviors in the plating cell as compared to conventional plating cells, both without membranes and those with the membranes discussed in the background of this application. Specifically, the behavior of a copper anode in an acid-free CuSO$_4$ solution is different from conventional anode behavior. First, the sludge formation rate is lower at current densities of up to about 60 mA/cm$_2$ than that in CuSOdH$_2$SO$_4$ electrolyte, especially at concentrations of less than about 0.5M. In more concentrated CuSO$_4$ solutions both the amount of sludge and the probability of anode passiviation increases, especially at low flow rates through the anode compartment. Further, although Cu+ generally forms on the anode in both conventional tools and the tool of the invention, in the configuration of the present invention it accumulates only into the anolyte, mainly at current densities of greater than about 30 mA/cm$_2$, when the oxygen dissolved in electrolyte has no time to convert Cu+ into Cu$^{2+}$ again. Further still, the stability of the anolyte and catolyte compositions decreases dramatically because of the small volumes of tanks.

Figure 4:
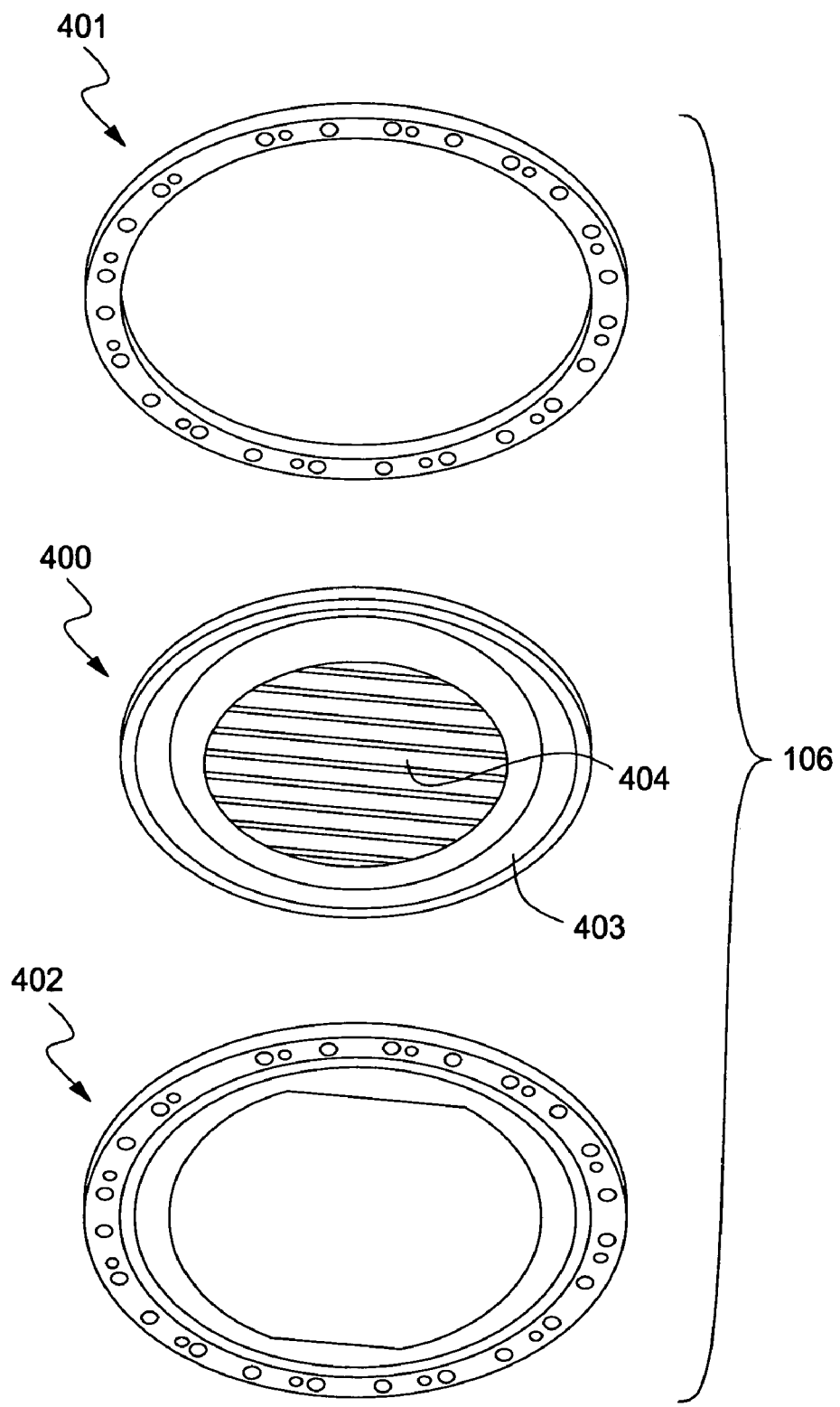
FIG. 4 illustrates an exploded perspective view of an exemplary membrane support member of the invention.

FIG. 4 illustrates an exploded perspective view of an exemplary membrane support assembly 106 of the invention. Membrane support assembly 106 generally includes an upper ring shaped support member 401, an intermediate membrane support member 400, and a lower support member 402. Upper and lower support member's 401 and 402 are generally configured to provide structural support to intermediate membrane support member 400, i.e., upper support member 401 operates to secure intermediate membrane support member 400 to lower support member 402, while lower support member 402 receives intermediate membrane support member 400. Intermediate membrane support member 400 generally includes a substantially planar upper surface having a plurality of bores (not shown) partially formed therethrough. A lower surface of intermediate membrane support member 400 generally includes a tapered outer portion 403 and a substantially planar inner membrane engaging surface 404. An upper surface of lower support member 402 may include a corresponding tapered portion configured to receive the tapered section 403 of intermediate membrane support member 400 thereon. The membrane engaging surface 404 generally includes a plurality of parallel positioned/orientated channels (not shown). Each of the channels formed into the lower surface of intermediate membrane support member 400 are in fluid communication with at least one of the plurality of bores partially formed through the planar upper surface. The channels operate to allow a membrane positioned in the membrane support assembly to deform slightly upward in the region of the channels, which provides a flow path for air bubbles and less dense fluids in the cathode chamber to travel to the perimeter of the membrane and be evacuated from the anode chamber.

In operation, the plating cell 100 of the invention provides a small volume (electrolyte volume) processing cell that may be used for copper electrochemical plating processes, for example. Plating cell 100 may be horizontally positioned or positioned in a tilted orientation, i.e., where one side of the cell is elevated vertically higher than the opposing side of the cell, as illustrated in FIG. 1. If plating cell 101 is implemented in a tilted configuration, then a tilted head assembly and substrate support member may be utilized to immerse the substrate at a constant immersion angle, i.e., immerse the substrate such that the angle between the substrate and the upper surface of the electrolyte does not change during the immersion process, or alternatively, at an angle that varies during the immersion process. Further, the immersion process may include a varying immersion velocity, i.e., an increasing velocity as the substrate becomes immersed in the electrolyte solution, and rotation of the substrate during the immersion process. The combination of the constant immersion angle, rotation, and the varying immersion velocity operates to eliminate air bubbles on the substrate surface.

Assuming a tilted implementation is utilized, a substrate is first immersed into a plating solution contained within inner basin 102. The immersion process generally includes positioning the substrate onto a substrate contact ring. The substrate contact ring is generally configured to both support the substrate for electrochemical processing, as well as electrically contact the substrate to facilitate the electrolytic plating reaction. The electrical contact between the contact ring and the substrate is generally made via a plurality of electrically conductive contact pins positioned and configured to electrically engage a perimeter portion of the substrate and supply a plating bias to the substrate sufficient to support plating operations. Exemplary contact rings may be found in commonly assigned U.S. Pat. No. 6,136,163, filed on Mar. 5, 1999 and entitled Apparatus for Electrochemical Deposition with Thermal Anneal, commonly assigned U.S. Pat. No. 6,251,236, filed on Nov. 30, 1998 entitled Cathode Contact Ring for Electrochemical Deposition, and commonly assigned U.S. patent application Ser. No. 10/355,479, filed on Jan. 31, 2003 entitled Contact Ring with Embedded Flexible Contacts. All of the above noted cases illustrating contact rings are incorporated by reference herein in their entirety, Once the substrate is immersed in the plating solution, which generally contains copper sulfate, a chlorine ion source, and one or more of a plurality of organic plating additives (levelers, suppressors, accelerators, etc.) configured to control plating parameters, an electrical plating bias is applied between a seed layer on the substrate and the anode 105 positioned in a lower portion of plating cell 100. The electrical plating bias generally operates to cause metal ions in the plating solution to deposit on the cathodic substrate surface. The plating solution supplied to inner basin 102 is continually circulated through inner basin 102 via fluid inlet/outlets 109 and conduits 206. More particularly, the plating solution may be introduced in plating cell 100 via a fluid inlet 109. The solution may travel across the lower surface of base member 104 and upward through one of fluid conduits 206. The plating solution may then be introduced into the cathode chamber via a channel formed into plating cell 100 that communicates with the cathode chamber at a point above membrane support 106 and in fluid communication with conduits 206. Similarly, the plating solution may be removed from the cathode chamber via a corresponding fluid conduit 206. For example, as discussed above with respect to FIG. 2, anode base member 104 may include first and second fluid apertures 206 positioned on opposite sides of the anode base member 404. The oppositely positioned fluid apertures 206 may operate to individually introduce and drain the plating solution from the cathode chamber in a predetermined direction, which also allows for flow direction control.

Once the plating solution is introduced into the cathode chamber, the plating solution travels upward through a diffusion plate 110. Diffusion plate 110, which is generally a ceramic or other porous disk shaped member, generally operates as a fluid flow restrictor to even out the flow pattern across the surface of the substrate. Further, the diffusion plate 110 operates to resistively damp electrical variations in the electrochemically active area of the anode or cation membrane surface, which has been shown to reduce plating uniformities. Additionally, embodiments of the invention contemplate that the ceramic diffusion plate 110 may be replaced by a hydrophilic plastic member, i.e., a treated PE member, a PVDF member, a PP member, or other material that is known to be porous and provide the electrically resistive damping characteristics provided by ceramics.

However, the plating solution introduced into the cathode chamber, which is generally a plating catholyte solution, i.e., a plating solution with additives, is not permitted to travel downward through the membrane (not shown) positioned on the lower surface 404 of membrane support assembly 106 into the anode chamber, as the anode chamber is fluidly isolated from the cathode chamber by the membrane. The anode chamber includes separate individual fluid supply and drain sources configured to supply an anolyte solution to the anode chamber. The solution supplied to the anode chamber, which may generally be copper sulfate in a copper electrochemical plating system, circulates exclusively through the anode chamber and does not diffuse or otherwise travel into the cathode chamber, as the ionic membrane 108 positioned on membrane support assembly 106 is not fluid permeable in either direction.

Additionally, the flow of the fluid solution (anolyte, i.e., a plating solution without additives, which may be referred to as a virgin makeup solution) into the anode chamber is also directionally controlled in order to maximize plating parameters. For example, anolyte may be communicated to the anode chamber via an individual fluid inlet 109. Fluid inlet 109 is in fluid communication with a fluid conduit 205 formed into a lower portion of the anode base member. A seal positioned radially outward of conduits 205, in conjunction with the surrounding structure, directs the anolyte flowing out of conduits 205 upward and into anode base slots 204. Thereafter, the anolyte generally travels across the upper surface of the anode 105 towards the opposing side of base member 104, which in a tilted configuration, is generally the lower side of plating cell 100. The anolyte travels across the surface of the anode below the membrane positioned immediately above. Once the anolyte reaches the opposing side of anode 105, it is received into a corresponding fluid conduit 205 and drained from plating cell 104 for recirculation thereafter.

During plating operations, the application of the electrical plating bias between the anode and the cathode generally causes a breakdown of the anolyte solution contained within the anode chamber. More particularly, the application of the plating bias operates to generate multiple hydrodynamic or Newtonian layers of the copper sulfate solution within the anode chamber. The hydrodynamic layers generally include a layer of concentrated copper sulfate positioned proximate the anode, an intermediate layer of normal copper sulfate, and a top layer of lighter and depleted copper sulfate proximate the membrane. The depleted layer is generally a less dense and lighter layer of copper sulfate than the copper sulfate originally supplied to the anode compartment, while the concentrated layer is generally a heavier and denser layer of copper sulfate having a very viscous consistency. The dense consistency of the concentrated layer proximate the anode causes electrical conductivity problems (known as anode passiviation) in anodes formed without anode slots 107. However, anode slots 107, in conjunction with the tilted orientation of plating cell 100, operate to receive the concentrated viscous layer of copper sulfate and remove the layer from the surface of the anode, which eliminates conductivity variances. Further, as noted above, plating cell 100 generally includes one side that is tilted upward or vertically positioned above the other side, and therefore, the upper surface of anode 105 is generally a plane that is also tilted. This tilt causes the layer of concentrated copper sulfate generated at the surface of the anode to generally flow downhill as a result of the gravitational force acting thereon. As the concentrated copper sulfate layer flows downhill, it is received within one of anode slots 107 and removed from the surface of the anode 105. As discussed above, anode slots 107 are generally parallel to each other and are orthogonal to anode base channels 204. As such, each of anode slots 107 intersect several of anode base channels 202 at the lower surface of the anode 105. This configuration allows the concentrated copper sulfate received within anode slots 107 to be communicated to one or more of anode base channels 202. Thereafter, the concentrated copper sulfate may be communicated via anode base channels 202 to the annular drain channel 203 positioned within recessed portion 201. The drain 203 in communication with anode base channels 202 may generally be communicated through base plate 104 and back to a central anolyte supply tank, where the concentrated copper sulfate removed from the anode surface may be recombined with a volume of stored copper sulfate used for the anolyte solution.

Figure 5:
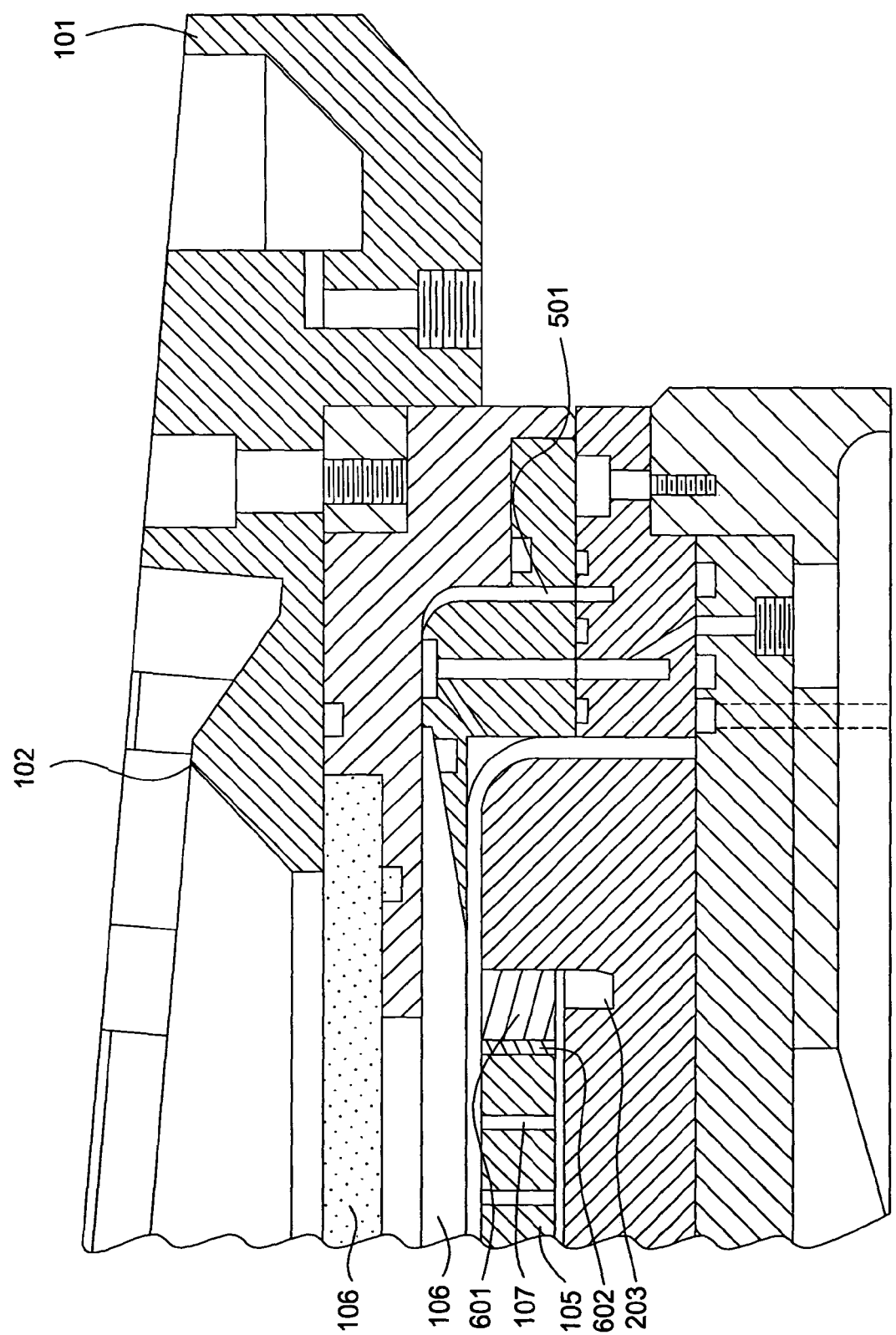
FIG. 5 illustrates a partial sectional view of an edge of the plating cell of the invention.

Similarly, the upper portion of anode chamber generates a diluted layer of copper sulfate proximate the membrane. The diluted layer of copper sulfate may be removed from the anode chamber via an air vent/drain 501, as illustrated in FIG. 5. Air vent/drain 501, which may include multiple ports, is generally positioned on the upper side of electrochemical plating cell 100, and therefore, is positioned to receive both bubbles trapped within anode chamber, as well as the diluted copper sulfate generated at the membrane surface. Air vents 501 are generally in fluid communication with the anolyte tank discussed above, and therefore, communicates the diluted copper sulfate received therein back to the anolyte tank, where the diluted copper sulfate may combine with the concentrated copper sulfate removed via anode slots 107 to form the desired concentration of copper sulfate within the anolyte tank. Any bubbles trapped by air vent 501 may also be removed from the cathode chamber vented to atmosphere or simply maintained within the anolyte tank and not recirculated into the cathode chamber.

The catholyte solution (the solution used to contact and plate metal/copper onto the substrate) generally includes several constituents. The constituents generally include a virgin makeup plating solution (a plating solution that does not contain and plating additives, such as levelers, suppressors, or accelerators, such as that provided by Shipley Ronal of Marlborough, Mass. or Enthone, a division of Cookson Electronics PWB Materials & Chemistry of London), water (generally included as part of the VMS, but is may also be added), and a plurality of plating solution additives configured to provide control over various parameters of the plating process. The catholyte is generally a low acid-type of plating solution, i.e., the catholyte generally has between about 5 g/l of acid and about 50 g/l of acid, or more particularly, between about 5 g/l and about 10 g/l. The acid may be sulfuric acid, sulfonic acid (including alkane sulfonic acids), pyrophosphoric acid, citric acid, and other acids known to support electrochemical plating processes. The desired copper concentration in the catholyte is generally between about 25 g/l and about 70 g/l, preferably between about 30 g/l and about 50 g/l of copper. The copper is generally provided to the solution via copper sulfate, and/or through the electrolytic reaction of the plating process wherein copper ions are provided to the solution via the anolyte from a soluble copper anode positioned in the catholyte solution. More particularly, cupper sulfate pentahydrate ($CuSO_4 \cdot 5H_2O$) may be diluted to obtain a copper concentration of about 40 g/l, for example. A common acid and copper source combination is sulfuric acid and copper sulfate, for example. The catholyte also has chlorine ions, which may be supplied by hydrochloric acid or copper chloride, for example, and the concentration of the chlorine may be between about 30 ppm and about 60 ppm.

As noted above, the plating solution (catholyte) generally contains one or more plating additives configured to provide a level of control over the plating process. The additives may include suppressors at a concentration of between about 1.5 ml/l and about 4 ml/l, preferably between about 2 ml/l and 3.0 ml/l. Exemplary suppressors include ethylene oxide and propylene oxide copolymers. Additives may also include accelerators at a concentration of between about 3 ml/l and about 10 ml/l, preferably within the range of between about 4.5 ml/l and 8.5 ml/l. Exemplary accelerators are based on sulfopropyl-disulfide or mercapto-propane-sulphonate and their derivatives. Additionally, another additive that may optionally be added to the catholyte solution is a leveler at a concentration of between about 1 ml/l and about 12 ml/l, or more particularly, in the range of between about 1.5 ml/l and 4 ml/l.

The anolyte solution, as noted above, is generally contained in the volume below the membrane and above the anode. The anolyte solution may be simply the catholyte solution without the plating additives, i.e., levelers, suppressors, and/or accelerators. However, the inventors have found that specific anolyte solutions, other than just stripped catholyte solutions, provide a substantial improvement in plating parameters. Specifically, copper transfer through the membrane and prevention of copper sulfate and hydroxide precipitation, i.e., when the Cu ions transport through membrane, copper sulfate accumulates in the anolyte and starts to precipitate on the anode provoking its passiviation are improved. When pH of the anolyte is maintained above about 4.5 to about 4.8, copper hydroxide starts to deposit from Cu salt solutions, i.e., $Cu_2++2H_2O=Cu(OH)_2$ (deposit)+2H+. More particularly, the inventors have found that if the anolyte can be configured to supply between about 90% and about 100% of the copper to the catholyte, then the membrane essentially operates as a clean copper anode, i.e., the membrane provides copper to the catholyte without the disadvantages associated with the electrochemical reaction that takes place at the surface of the anode (sludge formation, additive consumption, planarity variations due to erosion, etc.). The anolyte of the invention generally includes a soluble copper II salt (copper ions are not complexed with ligands like $NH_3$, or EDTA or phyrophoshoric acid anions, as Cu transports through the membrane together with this ligand, like $Cu(NH_3)4$ 2+ will transport together with $NH_3$, such as copper sulfate, copper sulfonate, copper chloride, copper bromide, copper nitrate, or a blend of any combination of these salts in an amount sufficient to provide a concentration of copper ions in the catholyte of between about 0.1M and about 2.5M, or more particularly, between about 0.25M and about 2M.

Additionally, the pH of the anolyte solution will generally be between about 1.5 and about 6, or more particularly, between about 2 and 4.8, for example. The pH is maintained in this range, as increasing the pH above this range in conventional plating configurations has been shown cause copper hydroxide precipitation. Additionally, when the pH is below 2, and particularly if the pH is below 1.5, then the solution supports a substantial increase in the hydrogen ion ($H^+$) transport through the membrane from the anolyte to the catholyte. In this situation, the bulk of the plating current is carried by the $H^+$ ions and the copper ion transport is reduced. As such, the copper ion concentration in the catholyte decreases, potentially to a critical level that will not support plating, while simultaneously the sulfuric acid concentration in the catholyte increases. The anolyte can generally use any soluble $Cu^{2+}$ salt, such as $CuSO_4$ (solubility 300 g/L), $CuBr_2$ (solubility more that 2 kg/L), $CuCl_2$ (solubility 700 g/L), $CuF_2$ (47 g/L), $Cu(NO_3)_2$ (1300 g/L) etc. The selection of anions depends on their impact to prevent or minimize Cu(l) formation and anode passiviation, on penetration through the membrane etc. For instance, the anolyte can be $CuSO_4$ (0.5 M) with small additions of $Cu(NO_3)$ to activate anode surface and minimize Cu(l) formation. To minimize Cu(l) formation, small additions of $Cu(ClO_3)_2$ (solubility 2 kg/L) or $Cu(IO_3)_2$-solubility 1 g/L may be used. In similar fashion to the catholyte, the source of copper in the anolyte (aside from the anode) may be copper sulfate pentahydrate ($CuSO_4 \cdot 5H_2O$) at between about 51 g/L and 70 g/L, or at between about 0.75 M and about 0.95 M. Alternatively, in a preferred embodiment, the copper source may be between about 51 g/L and about 60 g/L, preferably about 54 g/L, and at a molarity of between about 0.8 M and about 0.9 M, preferably about 0.85 M.

Figure 6:
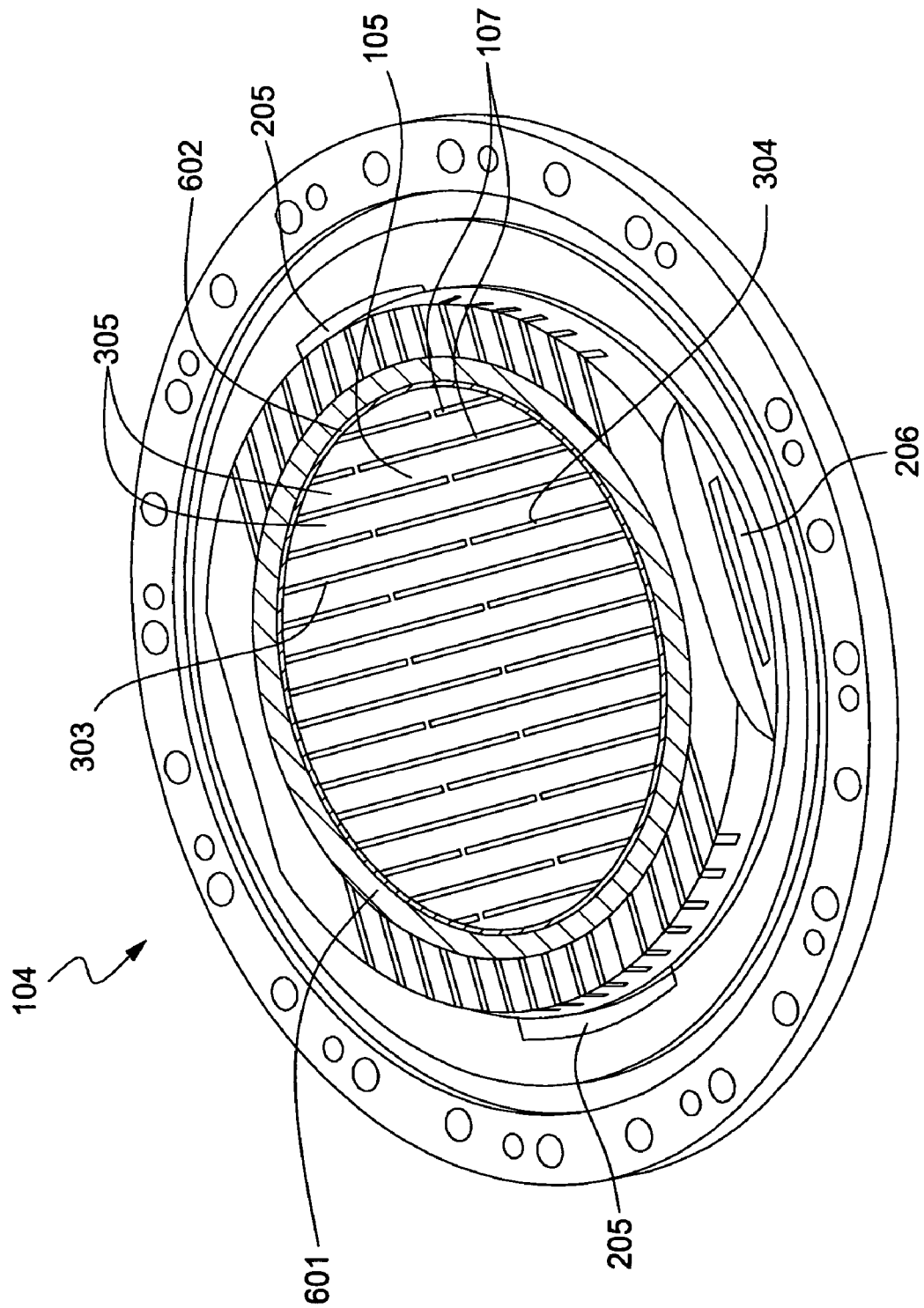
FIG. 6 illustrates a top perspective view of an exemplary anode base plate of the invention having the anode and the deplating electrode positioned therein.

FIG. 6 illustrates another embodiment of the anode base plate 104 wherein the deplating electrode 601 is implemented in combination with the anode 105. In this embodiment, the base plate 104 includes the disk shaped anode 105 in the central recessed portion. The base plate further includes an annular channel (not shown) formed radially outward of the grooved wall (the wall containing channels 204) outward of the anode 105. The annular groove includes an annularly shaped deplating electrode 601 positioned therein. Further, the configuration of the annular channel positions an insulative spacer 602 between the anode 105 and the deplating electrode 601. The insulative spacer 602 generally operates to electrically isolate the anode 105 from the deplating electrode 601. The insulative spacer 602 may also operate to prevent fluid, i.e., plating solution, from contacting the vertical sides of the deplating electrode 601, and further, the upper surface of the deplating electrode is generally positioned in the same plane as the upper surface of the anode 105 and in fluid contact with the anolyte solution in the plating cell. The deplating electrode 601 generally includes an annularly shaped electrode having a substantially planar upper surface that may be manufactured from copper, platinum, or other metal known to be effective as an either a soluble or insoluble anode in an electrochemical plating cell. Additionally, the deplating electrode 601 may be manufactured from a core material, such as copper, stainless steel, titanium, or other cost effective core electrode material, and then the outer surfaces, i.e., the upper surface of the deplating electrode 601 that is in fluid contact with the anolyte, may then be plated with another metal, such as platinum, titanium, or other electrode material. This configuration allows the cost of the electrode to be reduced, as a more cost effective and electrically conductive material is used to manufacture the core of the electrode, while another more costly but desirable electrode material, i.e., platinum, is used for the exposed surfaces of the deplating electrode 601. The inner diameter of the deplating electrode 601 is sized to be greater than the outer diameter of the substrate being plated in the plating cell. This configuration may reduce the field effect that the deplating electrode will have upon plating operations if the deplating electrode is activated (in an anodic configuration) during the plating process. The deplating electrode 601 is generally positioned in the same plane as the anode 105 and has an upper surface that is coplanar with the upper surface of the anode 105, however, the upper surface of the deplating electrode 601 may be elevated above or lowered below the upper surface of anode 105, as desired to control the field characteristics of the cell. The deplating electrode 601 is in electrical communication with a power supply that is configured to electrically bias the deplating electrode either anodically or cathodically, i.e., the deplating electrode may be biased cathodically to deplate metal from the contact pins that conduct the plating bias to the substrate in the plating cell or anodically to assist the primary anode 105 in the plating process. As such, the deplating electrode 601 may be used to either deplate the contact pins of the substrate contact ring, and also to assist in controlling the plating uniformity during the plating process via application of an anodic bias to the deplating electrode during plating, which essentially supplements or adds to the fields generated by the primary anode of the plating cell.

In another embodiment of the invention anode 105 is manufactured from a bipolar insoluble electrode material. In this embodiment the deplating electrode 601 may also be manufactured from a bipolar insoluble electrode material. In this embodiment the anode 105 and the deplating electrode 601 may be manufactured from platinum or other metal that is inert and operable as an anode material in an electrochemical plating solution. In this embodiment of the invention, a copper dosing system, such as a copper hydroxide dosing system, for example, may be used to replenish copper into the plating solution, i.e., the anolyte and catholyte of the plating cell, in place of the copper anode that supplies copper to conventional soluble anode plating cells.

In operation the deplating electrode 601 may be anodically biased in order to deplate copper that accumulates on the substrate contacts used to communicate a plating bias to a substrate during plating operations. As is known in the art, copper tends to build up on the electrical substrate contacts (as a result of the contacts being in communication with the plating solution during the plating process) and may cause varying resistances between the respective contacts and the substrates being plated, which often results in uniformity variations between plated substrates. As such, it is desirable to periodically remove the accumulated copper from the contacts so that plating uniformity between substrates may be maximized. The removal processes is generally conducted at a time period when no substrates are being plated, i.e., between plating substrates. At this time the substrate contact ring (or other apparatus includes the elements that are used to electrically contact the substrate during the plating process) is immersed in the plating solution such that the electrical contact pins are in fluid communication with the plating solution. Once immersed, a deplating bias is applied between the contact pins and the deplating electrode. More particularly, the deplating bias is configured such that the deplating electrode 601 is the cathode electrode and the substrate contact pins are the anodic electrodes. In this configuration the substrate contact pins supply the copper ions to the reduction reaction, and as such, the copper that was plated onto the contact pins during plating operations is removed from the contact pins, transported through the plating solution, and deposited on the deplating electrode in the reduction process resulting from the application of the deplating bias. The deplating bias may be between about 3 volts and about 7 volts, for example, and may have a duration of between about 10 seconds and about 30 seconds. Additionally, the deplating time may be increased to above 30 seconds if the time between deplating processes is long, i.e., if the number of substrates plated has been excessive and the copper buildup on the contact pins is more than can be removed in 30 seconds. In this situation the deplating time or duration may be calculated as 20 seconds multiplied by the number of substrates plated since the last deplating process. Thus, for example, if 20 substrates have been plated since the last contact pin deplating process, then the duration of the deplating process may be about 400 seconds to remove the excessive accumulation of copper on the contact pins. Embodiments of the invention contemplate that the contact pins may be deplated between every substrate that is plated in order to maximize uniformity and throughput. In this configuration the deplating process will likely have a duration of less than about 20 seconds. However, the inventors have found that the deplating process may be extended to between every second, third, or fourth plated substrate without a substantial degradation in the uniformity. In this configuration the deplating time may be between about 20 seconds and about 80 seconds, for example.

The copper ions that deposit or accumulate on the deplating electrode during the deplating process generally do not have an effect upon plating uniformity, as the deplating electrode may be idle during the plating process. However, the inventors have contemplated that the copper deposits plated onto the deplating electrode as a result of the deplating process may later be reintroduced into the plating bath via application of a forward plating bias to the deplating electrode 601 (along with the anode) during a plating process. This configuration essentially configures the deplating electrode as a secondary or auxiliary anode to the primary plating anode 105, and as such, when the forward plating bias is applied to the electrodes (anode 105 and deplating electrode 601), the copper ions that have plated onto the deplating electrode 601 will be removed from the deplating electrode surface via the reduction reaction that supports the plating process and reintroduced into the plating solution, or more particularly, into the anolyte. More particularly, the deplating electrode 601 may be electrically biased during plating operations to the same polarity as the anode 105, and as such, the deplating electrode 601 may contribute to the plating reaction, i.e., supply copper ions to the plating solution, as well as generating a magnetic and/or electric field in the plating cell. More particularly, since the deplating electrode is positioned radially outward of the substrate perimeter being plated, the electric field from the deplating electrode may be used to provide an additional element of control over plating uniformity across the surface of the substrate as a result of the field effect of the deplating electrode 601. The inventors have found that application of minimal current (a plating current) to the deplating electrode during plating processes repeatedly reduces the uniformity variation to less than 1.5% across the surface of plated substrates, where conventional plating cells without the deplating electrode operating during the plating process generally exhibit uniformity variations in the range of about 2% to about 4%, for example. The minimal current supplied to the deplating electrode during the plating process may be calculated to generate an electric field sufficient to interact with the substrate and/or the minimal current may be calculated to generate a shaping field, i.e., the field generated by the deplating electrode (which has a small magnitude) may primarily be used to shape the field generated by the anode 105 (which has a much larger magnitude, as the majority of the plating current is traveling through the anode 105). Alternatively, the deplating electrode 601 may be electrically biased to the same electrical potential as the primary anode 105. In this configuration the anode 105 and the deplating electrode 601 essentially operate as a unitary anode, particularly when the width of the insulative spacer 602 is minimized such that there is minimal discontinuity (generally less than about 3 mm) between the anode 105 and the deplating electrode 601.

Additional embodiments of the invention contemplate that the deplating electrode may be active (have a forward or plating bias applied thereto) for either the entire plating process time (the time when the primary anode is active) or for only a portion of the plating process. In embodiments where the deplating electrode 601 is active for only a portion of the plating process duration, the deplating electrode may be activated for a time period that is calculated to remove the copper deposits therefrom. For example, if the deplating electrode 601 is activated for 20 seconds during the deplating process, then the deplating electrode may be activated for another 20 seconds during the plating process. The effect of this configuration would be to clean the deplating electrode, i.e., to redeposit the copper that was plated onto the deplating electrode during the deplating process into the electrolyte solution, assuming that equal power is applied during both the deplating and plating steps.

While the foregoing is directed to embodiments of the present invention, other and further embodiments of the invention may be devised without departing from the basic scope thereof, and the scope thereof is determined by the claims that follow.

The inventioned claimed is:

1. An electrochemical plating cell, comprising:
   a fluid basin configured to contain a plating solution;
   an anode fluid volume positioned in a lower portion of the fluid basin;
   a cathode fluid volume positioned in an upper portion of the fluid basin;
   an ionic membrane positioned to separate the anode fluid volume from the cathode fluid volume;
   a plating electrode centrally positioned in the anode fluid volume; and
   a deplating electrode positioned radially outward from the plating electrode in the anode fluid volume, wherein the plating electrode comprises a disk member having a plurality of parallel slots formed therethrough, the plurality of parallel slots comprises a plurality of longer segments and a plurality of shorter segments.

2. The plating cell of claim 1, wherein the plating electrode comprises an insoluble anode.

3. The plating cell of claim 2, wherein the insoluble anode comprises a platinum electrode surface.

4. The plating cell of claim 2, wherein the deplating electrode comprises an annular platinum coated electrode positioned to circumscribe the insoluble anode and in substantially the same plane as the insoluble anode.

5. The plating cell of claim 1, further comprising an insulative spacer positioned between the plating electrode and the deplating electrode.

6. The plating cell of claim 1, further comprising a power supply in electrical communication with the deplating electrode and the plating electrode, the power supply being configured to cathodically bias the deplating electrode in a deplating configuration and anodically bias the plating electrode in a plating configuration.

7. The plating cell of claim 1, further comprising a power supply in electrical communication with the deplating electrode and the plating electrode, the power supply being configured to anodically bias the plating electrode in a plating configuration and selectively bias the deplating electrode anodically in the plating configuration and cathodically in a deplating configuration.

8. The plating cell of claim 1, wherein the plating electrode is copper and the deplating electrode is a platinum coated electrode.

9. An electrochemical plating cell, comprising:
an anolyte compartment;
a catholyte compartment positioned in ionic communication with the anolyte compartment via a cationic membrane;
an anode positioned in the anolyte compartment; and
a deplating electrode positioned in the anolyte compartment, wherein the anode is a disk shaped member having a plurality of parallel slots formed therethrough, the plurality of parallel slots comprises a plurality of longer segments and a plurality of shorter segments, and the deplating electrode circumscribes the anode.

10. The plating cell of claim 9, wherein the anode and the deplating electrode comprise a platinum outer surface.

11. The plating cell of claim 10, wherein the anode has a substantially planar upper surface and wherein the deplating electrode is an annular member having a substantially planar upper surface.

12. The plating cell of claim 11, wherein the upper surface of the deplating electrode is vertically movable relative to the upper surface of the anode.

13. The plating cell of claim 11, comprising an electrically insulative spacer positioned between the disk shaped member and the annular member.

14. The plating cell of claim 9, wherein the anode is in communication with an anodic terminal of a power supply and wherein the deplating electrode is in communication with a cathodic terminal of the power supply.

15. The plating cell of claim 9, wherein the anode is in communication with an anodic terminal of a power supply and wherein the deplating electrode is selectively in communication with a cathodic terminal of the power supply and the anodic terminal of the power supply.

* * * * *